United States Patent [19]
Kreighbaum et al.

[11] 3,872,130
[45] Mar. 18, 1975

[54] 1-HYDROXYISOQUINOLONES
[75] Inventors: **William Eugene Kreighbaum;
William Timmey Comer,** both of Evansville, Ind.
[73] Assignee: Mead Johnson & Company, Evansville, Ind.
[22] Filed: Nov. 23, 1973
[21] Appl. No.: 418,710

Related U.S. Application Data
[63] Continuation-in-part of Ser. No. 184,197, Sept. 27, 1971, Pat. No. 3,798,225.

[52] U.S. Cl..... 260/289 R, 260/283 SY, 260/345.2, 260/521 R, 424/258
[51] Int. Cl............................................. C07d 33/38
[58] Field of Search...................................... 260/289

[56] References Cited
FOREIGN PATENTS OR APPLICATIONS
286,496  2/1953  Switzerland..................... 260/289 R OTHER PUBLICATIONS
Evans et al., "J. Chem. Soc. (B)," pp. 590–595 (1967).

Primary Examiner—Donald G. Daus
Assistant Examiner—D. B. Springer
Attorney, Agent, or Firm—Robert H. Uloth; Robert E. Carnahan

[57]         ABSTRACT

New 6,7-dialkoxy-1-hydroxy-2-methyl-3(2H)-isoquinolones are disclosed having peripheral vasodilator, hypotensive and bronchodilator properties. The compounds are also valuable as intermediates in the preparation of pharmacologically active 3(2H)-isoquinolones. Preferred embodiments of the invention are 1,4-dihydro-1-hydroxy-6,7-dimethoxy-2-methyl-1-veratryl-3(2H)-isoquinolone and 1,4-dihydro-1-hydroxy-6,7-diethoxy-2-methyl-1-(3,4-diethoxybenzyl)-3(2H)-isoquinolone.

3 Claims, No Drawings

1-HYDROXYISOQUINOLONES

CROSS-REFERENCE TO RELATED APPLICATION

This application is a continuation-in-part application of U.S. Pat. application Ser. No. 184,197 filed Sept. 27, 1971, now U.S. Pat. No. 3,798,225.

BACKGROUND OF THE INVENTION

This invention is concerned with 1-hydroxyisoquinolones. In particular, it relates to 6,7-dialkoxy-1-hydroxy-2-methyl-3(2H)-isoquinolones which have therapeutic utility as peripheral vasodilataor, hypotensive, and bronchodilator agents and, in addition, are valuable as intermediates in the preparation of pharmacologically active 3(2H)-isoquinolones. Representative of the literature most closely related to the present invention is an article co-authored by the present inventors published in J. Med. Chem., 15, 1131 (1972) which deals with the synthesis of papaverine analogs.

SUMMARY OF THE INVENTION

This invention relates to novel 6,7-dialkoxy-1-hydroxy-2-methyl-3(2H)-isoquinolones characterized by following structural Formula I.

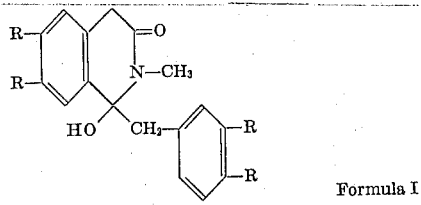

Formula I wherein R designates lower alkoxy containing from 1 to 4 carbon atoms inclusive. The term "lower alkoxy" as used herein contemplates both straight and branched chain carbon groups such as methyl, ethyl, propyl, isopropyl, 1-butyl, 1-methylpropyl, 2-methylpropyl and the like.

Compounds of the above structure are useful as intermediates for the synthesis of 3(2H)-isoquinolones in a dehydration process which comprises treating the compounds of the instant invention with an acid such as hydrochloric acid. The 3(2H)-isoquinolones provided by the instant compounds are valuable for their peripheral vasodilator oand hypotensive properties and are disclosed and claimed in co-pending U.S. Pat. application Ser. No. 184,197 entitled "3(2H)-ISOQUINOLONES" now U.S. Pat. No. 3,798,225. In addition to utility as intermediates, the instant compounds have valuable pharmacological properties exhibiting peripheral vasodilator, hypotensive, and bronchodilator effects, when orally administered to mammals in an effective relatively non-toxic dose ranging from about 0.05 to 50 mg./kg. body weight of the mammal. The dosage will vary with the particular compound chosen. Generally, the compound is orally administered at a dosage substantially less than the dose of the compound thought to be effective. Thereafter, in conformity with accepted therapeutic methods, the dosage is increased by small increments until the desired pharmaceutical effect is obtained.

Compounds particularly preferred for their oral peripheral vasodilating, hypotensive and bronchodilator effects in mammals are 1,4-dihydro-1-hydroxy-6,7-dimethoxy-2-methyl-1-veratryl-3(2H)-isoquinolone and 1,4-dihydro-1-hydroxy-6,7-diethoxy-2-methyl-1-(3,4-diethoxybenzyl)-3(2H)-isoquinolone.

Compounds of the instant invention characterized by Formula I are prepared by condensation of methylamine and a lactone corresponding to Formula II depicted below wherein R is previously defined lower alkoxy.

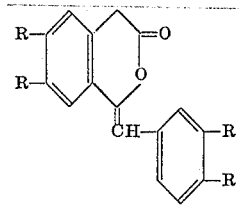

Formula II

This condensation reaction is effected by passing methylamine into a solution of the lactone in an inert organic solvent. Tetrahydrofuran is a preferred solvent but other solvents such as benzene, toluene, dioxane, acetonitrile, ethyl acetate, and the like are also suitable. Preferably, the reaction is conducted at a temperature of about 25°C. although this temperature is not critical and reaction temperatures appreciably above and below are also operable. When the condensation reaction is completed, the solvent is evaporated and residual crude product crystallized from an appropriate solvent such as acetonitrile-isopropyl ether, ethyl acetate, etc.

Under normal conditions, the instant 1-hydroxy-2-methyl-3(2H)-isoquinolones are are stable but in an acid or basic environment they are unstable. For example, 1,4-dihydro-1-hydroxy-6,7-dimethoxy-2-methyl-1-veratryl-3(2H)-isoquinolone in the presence of hydrochloric acid at concentrations as low as 0.1 to 1% is rapidly converted to 6,7-dimethoxy-2-methyl-1-veratryl-3(2H)-isoquinolone hydrochloride.

Lactones of Formula II are obtained by dehydrating the corresponding keto acid which is, in turn, obtained by intermolecular acylation of the appropriate 3,4-di(alkoxy)phenylacetic acid in polyphosphoric acid. For instance, the keto acid 2-[3,4-dimethoxyphenyl)acetyl]-4,5-dimethoxyphenyl acetic acid prepared from 3,4-dimethoxyphenylacetic acid is converted to the lactone, 6,7-dimethoxy-1-veratrylidene-3-isochromanone, by heating in decalin or a mixture of glacial acetic acid-acetic anhydride with a catalytic amount of sulfuric acid. Procedures for preparation of Formula II lactone reactants and keto acid precursors therefor are described in the literature on the subject; refer to G. N. Dorofeenko and V. G. Korobkova, J. Gen. Chem., USSR, 40, 230 (1970); I. W. Elliott, J. Heterocyclic Chem., 7, 1229 (1970); 9, 853 (1972); W. E. Kreighbaum, W. F. Kavanaugh, W. T. Comer, and D. Deitchman, J. Med. Chem., 15, 1131 (1972).

The compounds which constitute this invention and their methods for preparation will appear more fully from the consideration of the following examples which are given for the purpose of illustration only and are not to be construed as limiting the invention in spirit and scope.

Preparation of
1,4-Dihydro-1-hydroxy-6,7-dimethoxy-2-methyl-1-veratryl-3(2H)-isoquinolone.

A mixture of the keto acid, 2-[(3,4-dimethoxyphenylacetyl)]-4,5-dimethoxyphenylacetic acid (10.0 g., 0.0267 mole), 17 ml. of acetic anhydride, 17 ml. of glacial acetic acid, and 2 drops of concentrated sulfuric acid is heated at steam bath temperature for 4 hr. After standing at room temperature overnight, the mixture is filtered and the filter cake washed with ether and air dried to provide 7.0 g. (74%) of the lactone "1-(3,4-dimethoxybenzylidene)-6,7-dimethoxy-3-isochromanone" as a white solid, m.p. 162°–165°C.

Gaseous methylamine is passed into a suspension of the lactone (3.6 g., 0.01 mole) in 100 ml. of dry tetrahydrofuran until complete solution is obtained. The mixture is left standing overnight at room temperature or stirred for a period of 18 hr. at 25°C. and then concentrated under reduced pressure. The residue consisting of the crude product is crystallized from acetonitrile-isopropyl ether to afford a 60% yield of 1,4-dihydro-1-hydroxy-6,7-dimethoxy-2-methyl-1-veratryl-3(2H)-isoquinolone, m.p. 141.5–143.5°C. (corr.) as colorless crystals.

Anal. Calcd. for $C_{21}H_{25}NO_6$ (percent): C, 65.10; H, 6.50; N, 3.62. Found (percent): C, 65.06; H, 6.60; N, 3.58.

NMR delta (dimethylsulfoxide-$D_6$): 7.16, 6.20, 6.80, 6.03 (5H, aromatic), 6.70 (1H singlet, OH), 3.45-3.83 (12H, multiplet, $OCH_3$), 3.08 (3H, singlet, $NCH_3$), 2.70-3.20 (2H, multiplet, $CH_2$), 1.80-2.10 (2H, doublet, $CH_2$).

Infrared: ($\gamma$ max (Nujol)) cm.$^{-1}$, 3520 (OH), 1645 (amide).

Following the above procedure, the 1-hydroxyisoquinolones
1,4-dihydro-1-hydroxy-6,7-diethoxy-2-methyl-1-(3,4-diethoxybenzyl)-3(2H)-isoquinolone,
1,4-dihydro-1-hydroxy-6,7-diisopropoxy-2-methyl-1-(3,4-diisopropoxybenzyl)-3(2H)-isoquinolone, and
1,4-dihydro-1-hydroxy-6,7-di-n-butoxy-2-methyl-1-(3,4-di-n-butoxybenzyl)-3(2H)-isoquinolone,
are produced from the lactones
1-(3,4-diethoxybenzylidene)-6,7-diethoxy-3-isochramanone,
1-(3,4-diisopropoxybenzylidene)-6,7-diisopropoxy-3-isochromanone, and
1-(3,4-di-n-butoxybenzylidene)-6,7-di-n-butoxy-3-isochromanone, respectively.

Intermolecular acylation of the 3,4-dialkoxyphenylacetic acids,
3,4-dimethoxyphenylacetic acid,
3,4-diethoxyphenylacetic acid,
3,4-diisoproproxyphenylacetic acid, and
3,4-di-n-butoxyphenylacetic acid,
in polyphosphoric acid provides the lactone keto acid precursors
2-[(3,4-dimethoxyphenyl)acetyl]-4,5-dimethoxyphenylacetic acid,
2-[(3,4-diethoxyphenyl)acetyl]-4,5-diethoxyphenylacetic acid,
2-[(3,4-diisopropoxyphenyl)acetyl]-4,5-diisopropoxyphenylacetic acid, and
2-[(3,4-di-n-butoxyphenyl)acetyl]-4,5-di-n-butoxyphenylacetic acid, respectively.

Preparation of 3(2H)-isoquinolone from
1-hydroxy-2-methyl-3(2H)-isoquinolones.-

1,4-Dihydro-1-hydroxy-6,7-dimethoxy-2-methyl-1-veratryl-3(2H)-isoquinolone is taken up in methanol (0.01 mole) and acidified with 5N ethanolic hydrogen chloride. The acidified solution is concentrated under reduced pressure and the product crystallized from ethanol-ethyl acetate provides a 76% yield of 6,7-dimethoxy-2-methyl-1-veratryl-3(2H)-isoquinolone hydrochloride, m.p. 233°–236°C. (dec)(uncorr.).

Following the above procedure, the 3(2H)-isoquinolones
6,7-diethoxy-2-methyl-1-(3,4-diethoxybenzyl)-3-(2H)-isoquinolone hydrochloride,
6,7-diisopropoxy-2-methyl-1-(3,4-diisopropoxybenzyl)-3(2H)-isoquinolone hydrochloride, and
6,7-di-n-butoxy-2-methyl-1-(3,4-di-n-butoxybenzyl)-3(2H)-isoquinolone hydrochloride,
are produced from the 1-hydroxyisoquinolones
1,4-dihydro-1-hydroxy-6,7-diethoxy-2-methyl-1-(3,4-diethoxybenzyl)-3(2H)-isoquinolone,
1,4-dihydro-1-hydroxy-6,7-diisopropoxy-2-methyl-1-(3,4-diisopropoxybenzyl)-3(2H)-isoquinolone, and
1,4-dihydro-1-hydroxy-6,7-di-n-butoxy-2-methyl-1-(3,4-di-n-butoxybenzyl)-3(2H)-isoquinolone, respectively.

What is claimed is:

1. A compound selected from the group of 6,7-dialkoxy-1-hydroxy-2-methyl-3(2H)-isoquinolines having the formula

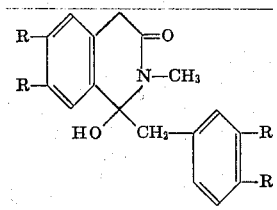

wherein R is lower alkoxy from 1 to 4 carbon atoms inclusive.

2. The compound of the group defined in claim 1 which is 1,4-dihydro-1-hydroxy-6,7-dimethoxy-2-methyl-1-veratryl-3(2H)-isoquinolone.

3. The compound of the group defined in claim 1 which is 1,4-dihydro-1-hydroxy-6,7-diethoxy-2-methyl-1-(3,4-diethoxybenzyl)-3(2H)-isoquinolone.

* * * * *